(No Model.) 2 Sheets—Sheet 1.
F. SHLAUDEMAN.
OILING APPARATUS FOR GAS COMPRESSORS.
No. 378,941. Patented Mar. 6, 1888.
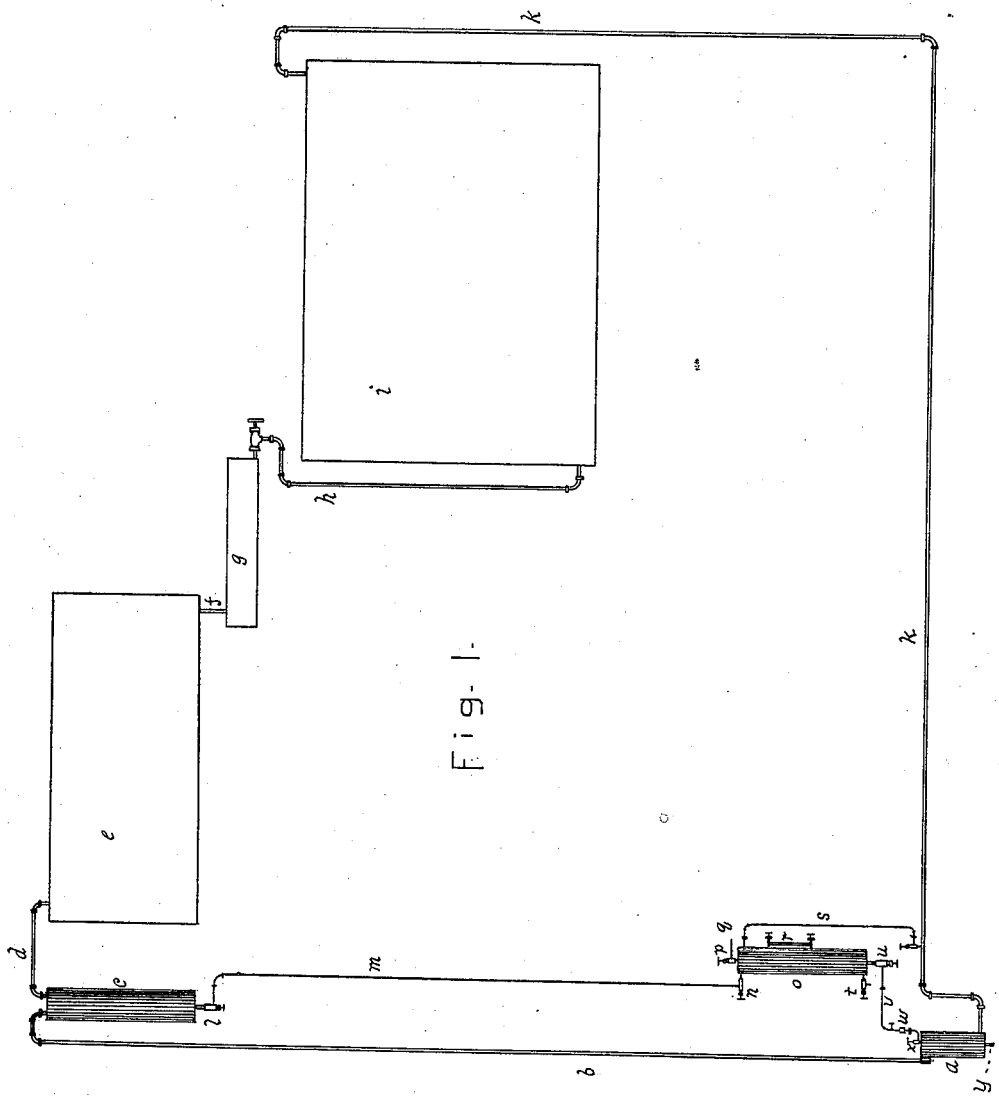
ATTEST
A. Spaeth.
H. Metz.
INVENTOR
Frank Shlaudeman
By L. P. Graham
his attorney

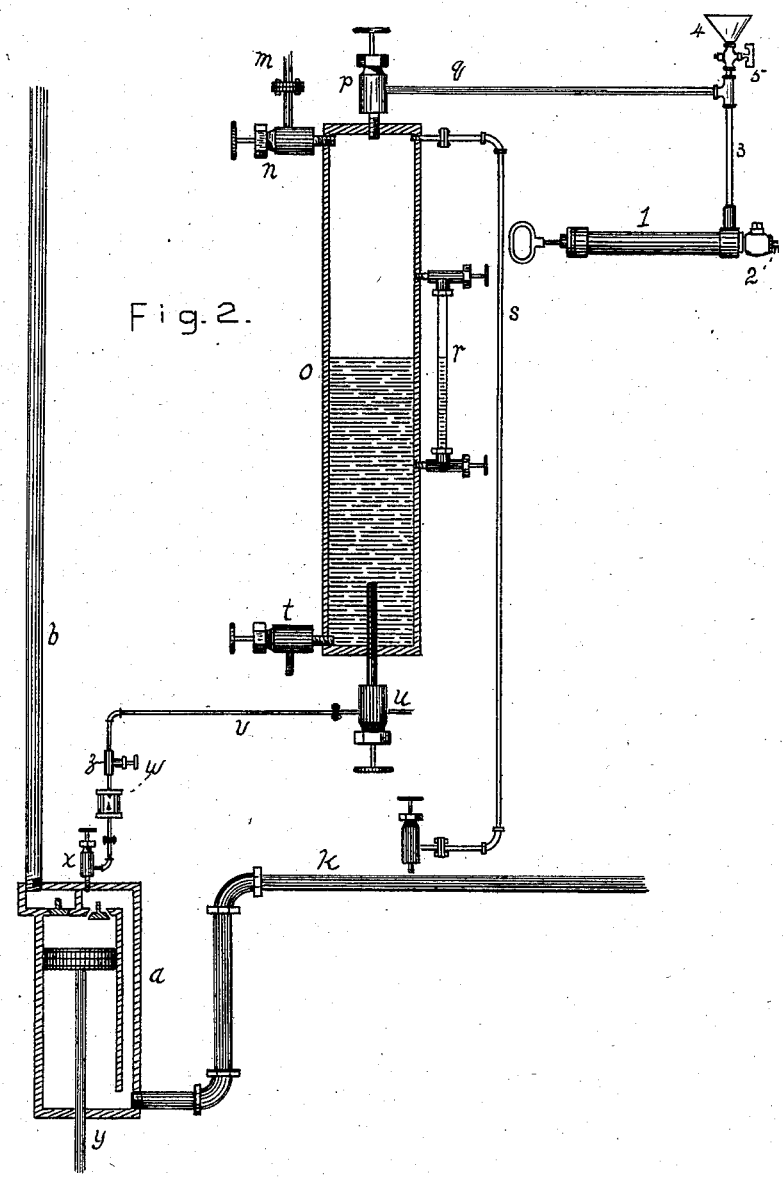

UNITED STATES PATENT OFFICE.

FRANK SHLAUDEMAN, OF DECATUR, ILLINOIS.

OILING APPARATUS FOR GAS-COMPRESSORS.

SPECIFICATION forming part of Letters Patent No. 378,941, dated March 6, 1888.

Application filed June 6, 1887. Serial No. 240,434. (No model.)

*To all whom it may concern:*

Be it known that I, FRANK SHLAUDEMAN, of the city of Decatur, county of Macon, and State of Illinois, have invented a certain new and useful Oiling Apparatus for Gas-Compressors, of which the following is a specification.

It is the object of my invention to continuously and automatically use a supply of oil for lubricating the valves and piston of a gas-compressing pump, and I attain my object by means of the apparatus hereinafter set forth and claimed.

In the drawings accompanying and forming a part of this specification, Figure 1 represents my apparatus applied to an ice-machine, the various parts of said machine being arranged in one plane and shown in side elevation. Fig. 2 is a side elevation of my invention, the oil-reservoir and pump-cylinder being shown in central vertical section.

Oil is supplied to reservoir $o$ by means of force-pump 1, which draws the oil from the supply-vessel through pipe 2 and forces it through pipes 3 and $q$ and valve $p$. The stem of valve $u$ extends upward through the bottom of the reservoir and terminates some distance above said bottom. The valve $u$ forms a distributing-head, from which pipes may extend in various directions to any number of pumps supplied from the same source. The pipe $v$ conveys oil to the feed-sight $w$ through flow-regulating valve $z$. The valve $x$ prevents the piston from intermittently forcing the gas into the feed-sight, thereby securing a uniform flow of oil.

In the pump-cylinder $a$ the oil mingles with the gas and performs its lubricating functions in the customary manner. From the pump the oil and gas are forced through pipe $b$ to oil-trap $c$. The oil settles to the bottom of the trap. The gas passes through pipe $d$, condensing-coils $e$, pipe $f$, liquid-reservoir $g$, pipe $h$, expansion-coils $i$, and pipe $k$ to the pump-cylinder in the order named, or in any suitable manner, my invention having no reference to this part of the machine. The oil passes from the bottom of the trap to the reservoir and from the reservoir to the pump-cylinder, where the operation as above described is again begun and the continuous circulation automatically maintained.

The valve $l$ enables the flow of oil to be stopped at the trap. The valve $n$ regulates the flow of oil into the oil-reservoir, and may either be set to continuously supply a certain desired quantity or may be manipulated to operate intermittently at full capacity, supplying to the reservoir at each manipulation a quantity of oil sufficient to lubricate the pump for a given time. A pipe, $s$, connects the supply or suction pipe $k$ with the upper portion of the oil-reservoir and neutralizes the pressure of the gas in the pump-cylinder against the inflowing oil by directing pressure of a similar nature and corresponding force against the upper surface of the oil in the reservoir. The valve-connection of pipe $s$ with pipe $k$ enables the pressure on the oil in the reservoir to be varied, if desired. The gage-glass $r$ enables the amount of oil in the reservoir to be readily determined. The valve $t$ permits the settlings of the reservoir to be blown off.

Couplings in the various pipes enable the ready detachment of said pipes for cleaning or repairing, and the arrangement of valves is such that a pipe may be temporarily detached without necessitating a stop of the gas-compressor or interfering seriously with the operation of the oiling apparatus.

The reference-letter $y$ is applied to the piston-rod of the pump, and said rod may be operated in any suitable manner.

During the operation of the oiling apparatus, as above described, the valve $p$ remains closed. When the supply of oil becomes unduly diminished by unavoidable waste, the said valve is opened and the reservoir replenished as it was originally supplied. The replenishing operation may be conducted without stopping the machine, and as a preliminary step the valve 5 of pipe 3 is opened and the air forced out by the initial action of the injection-pump. The oil forced out with the air is retained in the funnel 4 until removal of pressure permits it to return to the pump, when the valve is again closed and the oil injected into the reservoir.

Having thus described my invention, I claim as new and desire to secure by Letters Patent—

In combination with the pump, the oil-trap, and the suction-pipe of a gas-compressor, an oil-reservoir, a pipe connecting the reservoir with the lower portion of the oil-trap, a pipe connecting the reservoir with the pump-cylinder, and a pipe connecting the upper portion of the reservoir with the suction-pipe of the gas-compressor.

In testimony whereof I sign my name in the presence of two subscribing witnesses.

FRANK SHLAUDEMAN.

Attest:
I. D. WALKER,
L. P. GRAHAM.